US008895854B2

(12) United States Patent
Taniguchi et al.

(10) Patent No.: US 8,895,854 B2
(45) Date of Patent: Nov. 25, 2014

(54) WIRING HARNESS AND MANUFACTURING METHOD THEREOF

(75) Inventors: Moriatsu Taniguchi, Susono (JP); Makoto Katsumata, Susono (JP); Keigo Sugimura, Susono (JP); Atsushi Hoshino, Makinohara (JP)

(73) Assignee: Yazaki Corporation, Tokyo (JP)

( * ) Notice: Subject to any disclaimer, the term of this patent is extended or adjusted under 35 U.S.C. 154(b) by 73 days.

(21) Appl. No.: 13/580,523

(22) PCT Filed: Feb. 23, 2011

(86) PCT No.: PCT/JP2011/054676
§ 371 (c)(1), (2), (4) Date: Aug. 22, 2012

(87) PCT Pub. No.: WO2011/108558
PCT Pub. Date: Sep. 9, 2011

(65) Prior Publication Data

US 2012/0312596 A1 Dec. 13, 2012

(30) Foreign Application Priority Data

Mar. 2, 2010 (JP) ................................ 2010-045634
Mar. 2, 2010 (JP) ................................ 2010-045635

(51) Int. Cl.
*H02G 11/00* (2006.01)
*H02G 15/08* (2006.01)
(Continued)

(52) U.S. Cl.
CPC ................ *H01B 13/012* (2013.01); *H01B 7/36* (2013.01); *H01B 13/345* (2013.01)
USPC ............ 174/72 A; 174/72 R; 29/825; 29/857; 29/747; 439/578; 439/34; 524/361

(58) Field of Classification Search
CPC ................................. H02G 3/04; H01R 43/00
USPC ................ 174/72 A, 72 R; 29/857, 825, 747; 524/361; 439/578, 34
See application file for complete search history.

(56) References Cited

U.S. PATENT DOCUMENTS 6,129,578 A * 10/2000 McCarrick et al. ........... 439/488
6,161,278 A * 12/2000 Easter et al. .................... 29/749
(Continued)

FOREIGN PATENT DOCUMENTS

CN 101400748 A 4/2009
JP 61-245412 A 10/1986
(Continued)

OTHER PUBLICATIONS

International Search Report and Written Opinion of the International Searching Authority dated Jun. 7, 2011, issued for PCT/JP2011/054676.

(Continued)

*Primary Examiner* — Timothy Thompson
*Assistant Examiner* — Rashen E Morrison
(74) *Attorney, Agent, or Firm* — Edwards Wildman Palmer LLP

(57) ABSTRACT

There is provided an electric wire 1 comprising an electrically-conductive conductor portion and an insulating cover portion 11 covering the conductor portion. A colored marker 13 is provided on an end portion of the cover portion 11. The colored marker 13 indicates that the electric wire is a manually-incorporated wire. A circuit identifier 12 is provided on an intermediate portion of the cover portion 11. The circuit identifier 12 is made by printing or provided in the form of a mark and indicative of a connection destination of the electric wire 1. The colored marker in the end portion is made by an ink inferior to that of the circuit identifier on the intermediate portion in at least one property selected from among adhesiveness, weatherability, heat resistance, and chemical resistance.

10 Claims, 3 Drawing Sheets

(51) Int. Cl.

| | |
|---|---|
| ***H01R 43/00*** | (2006.01) |
| ***H01B 13/012*** | (2006.01) |
| ***H01B 7/36*** | (2006.01) |
| *H01B 13/34* | (2006.01) |

(56) References Cited

U.S. PATENT DOCUMENTS

| | | | | |
|---|---|---|---|---|
| 6,291,770 | B1 * | 9/2001 | Casperson | 174/72 A |
| 6,484,628 | B2 * | 11/2002 | Otani et al. | 101/35 |
| 6,596,942 | B2 * | 7/2003 | Ito et al. | 174/72 A |
| 7,275,317 | B2 * | 10/2007 | Kamata et al. | 29/857 |
| 7,320,553 | B1 * | 1/2008 | Nunez | 401/198 |
| 7,534,129 | B2 * | 5/2009 | Boldy | 439/491 |
| 2004/0242068 | A1 * | 12/2004 | Fukuda et al. | 439/596 |
| 2006/0102379 | A1 * | 5/2006 | Suzuki et al. | 174/110 R |
| 2009/0182080 | A1 * | 7/2009 | Kamata et al. | 524/361 |

FOREIGN PATENT DOCUMENTS

| | | | |
|---|---|---|---|
| JP | 2003-061234 | A | 2/2003 |
| JP | 2007-197645 | A | 8/2007 |
| WO | WO-03/046933 | A1 | 6/2003 |

OTHER PUBLICATIONS

Chinese Office Action dated Jan. 8, 2014 for corresponding Chinese Patent Application No. 201180012103.4.

* cited by examiner

WIRING HARNESS AND MANUFACTURING METHOD THEREOF

TECHNICAL FIELD

The present invention relates in general to a wiring harness and a manufacturing method thereof, and in particular to a wiring harness comprising electric wires each having a core wire, a cover portion covering the core wire, and a coloring feature provided upon the cover portion, and to a manufacturing method thereof.

BACKGROUND ART

In a conventional process of assembling a wiring harness by putting electric wires together to construct the wiring harness, a coloring feature is applied to cover portions of the electric wires such that property of individual electric wire can be identified by the coloring feature (for example, see the patent literature PTL 1).

CITATION LIST

Patent Literature

PTL 1: International Patent Application Publication No. WO2003/046933

SUMMARY OF THE INVENTION

Technical Problem

When identification of electric wires of a known wiring harness as disclosed in the patent literature PTL 1 is made relying on coloring feature provided on the cover portions of the electric wires, all of the wires or circuits belonging to the wiring harness have to be discerned or distinguished from each other by the coloring feature alone, which will require considerably large ink usage.

In addition, in the context of the process of assembling the wiring harness, the electric wires may include both a mechanically-incorporated wire where the electric wire is put together mechanically, i.e., using a machine, and a manually-incorporated wire where the electric wire is put together manually by an operator. If the coloring is made to discern the electric wires of both the mechanically-incorporated wire and the manually-incorporated wire, then the considerably large ink usage will become even larger.

Further, when the coloring is applied on the electric wire, higher colorability is desirable and thus a prerequisite is that an ink does not come off the electric wire. In view of the colorability, it is oftentimes necessary to use an expensive ink, which understandably causes undesirable increase in manufacturing costs.

The present invention has been made to address these drawbacks found in the prior art, and an object of the present invention therefore is to provide an electric wire and a wiring harness incorporating the electric wire that allow for reduction in ink usage and decrease in manufacturing costs without causing degradation in discernibility of the electric wires.

Another object of the present invention is to provide a method for manufacturing a wiring harness that allows for both reduction in ink usage and a sufficient level of discernibility of electric wires.

Solution to Problem

In accordance with a feature of the invention, there is provided a wiring harness comprising (a) at least one electric wire adapted to be incorporated into the wiring harness manually by an operator, and (b) at least an other electric wire adapted to be incorporated into the wiring harness mechanically.

The at least one electric wire includes (i) an electrically-conductive conductor portion, (ii) an insulating cover portion covering the conductor portion, (iii) a colored marker provided on an end portion of the cover portion, the colored marker indicating that the electric wire is a manually-incorporated wire, and (iv) a circuit identifier provided on an intermediate portion of the cover portion.

The circuit identifier is made by printing or provided in a form of a mark and indicative of a connection destination of the electric wire.

The colored marker in the end portion is made by an ink inferior to that of the circuit identifier on the intermediate portion in at least one property selected from the group consisting of adhesiveness, weatherability, heat resistance, and chemical resistance.

The at least one other electric wirer has a cover portion whose end portion does not include the colored marker. Meanwhile, an intermediate portion of the cover portion includes the circuit identifier indicative of a connection destination of the at least one other electric wire.

With the construction and arrangement described above, the colored marker indicating that this electric wire is the manually-incorporated wire is provided at the end portion of the cover portion of the manually-incorporated wire. Accordingly, coloring features do not need to be provided for the mechanically-incorporated wires and thereby ink usage can be reduced. Also, the operator manually incorporating the electric wire into the wiring harness can discern the electric wire by referencing the colored marker.

Further, the circuit identifier indicative of the connection destination is provided by printing or provided in the form of a mark upon the intermediate portion of the cover portion. In contrast to the case where only colored marker is relied upon to discern the electric wire, the electric wire can be discerned by characters, dots, and symbols and thus the representation of information can be made more compact, which leads to reduction in the ink usage.

Also, the colored marker at the end portion is made by the ink inferior in at least one property selected from among the adhesiveness, the weatherability, the heat resistance, and the chemical resistance, being inferior to that used in the circuit identifier at the intermediate portion. In this context, with regard to the manually-incorporated wire, it only needs to be discerned in the wiring harness assembling process, and after the assembling process, there will be no problem even when the colored marker comes off the electric wire. Thus, since the colored marker is made by the ink inferior in any one of the weatherability, the heat resistance, and the chemical resistance, the colored marker can be made using an inexpensive ink, so that the manufacturing costs are reduced. In summary, it is possible to reduce the ink usage and the manufacturing costs without degrading the discernibility of the electric wire.

Preferably, a plurality of the circuit identifiers are provided at regular intervals on the intermediate portion of the cover portions of the at least one electric wire and the at least one other electric wire.

Since the circuit identifiers are provided at regular intervals on the intermediate portion, it is possible to read the circuit identifier relying upon the remaining portion even when the electric wire is partly burnt out due to reasons such as automobile's environment at and after the stage of incorporation of the electric wires into the wiring harness.

Preferably, the cover portions of the at least one electric wire and the at least one other electric wire each have a single color or an original color of coating resin, so that it is made possible to reduce the manufacturing costs.

Since the electric wire has the single color or the original color of the coating resin, it is possible to facilitate reduction in inventory quantity when compared with a case where various electric wires having different colored markers are manufactured.

Another aspect of the invention provides a method for manufacturing a wiring harness, comprising the steps in the sequence set forth: (a) printing, or providing in a form of a mark, a circuit identifier on a continuously fed electric wire, the circuit identifier being indicative of a connection destination of the electric wire; (b) cutting in a predetermined length the electric wire having the circuit identifier; (c) providing a colored marker on an end portion of at least one electric wire selected from the electric wires that have been cut, the at least one electric wire being adapted to be incorporated into the wiring harness manually by an operator; and (d) putting together the at least one electric wire serving as the manually-incorporated wire and at least an other electric wire selected from the electric wires that have been cut to construct the wiring harness, the at least one other electric wire being adapted to be incorporated into the wiring harness mechanically, and having a cover portion whose end portion does not include the colored marker, wherein an intermediate portion of the cover portion includes the circuit identifier indicative of a connection destination of the at least one other electric wire.

The circuit identifier indicative of the connection destination is provided by printing, or provided in the form of a mark, upon the intermediate portion of the cover portion of the continuously fed electric wire.

Accordingly, in contrast to the case where only colored marker is relied on to discern the electric wire, the electric wire can be discerned by characters, dots, and symbols and thus the representation of information can be made more compact, which leads to reduction in the ink usage.

Also, since the colored marker is made to the end portion of the electric wire serving as the manually-incorporated wire among the electric wires that have been cut, the mechanically-incorporated wire does not need to have a colored marker, which allows for reduction in the ink usage, and the operator manually incorporating the electric wire into the wiring harness can discern the electric wire (from the other electric wires) by referencing the colored marker. In summary, it is possible to reduce the ink usage and at the same time effectively discern the electric wires.

Preferably, in the printing step, a plurality of the circuit identifiers are provided at regular intervals on the electric wires that have been cut.

With this specific construction, even when the electric wires incorporated into the wiring harness are partly burnt due to, for example, automobile's environment, it will still be possible to read the circuit identifier(s) remaining upon the survived portion, for the circuit identifiers are arranged at regular intervals on the intermediate portion of the electric wires.

Preferably, the method further comprises, prior to the printing step, the step of manufacturing the electric wire, wherein a cover portion of the manufactured electric wire has a single color or an original color of coating resin.

Since the cover portion of the electric wire where the circuit identifier is found has the single color or the original color of the coating resin, this manufacturing method allows for reduction in the manufacturing costs. Also, since the electric wire has the single color or the original color of the coating resin, the method also facilitates reduction in inventory quantity when compared with a case where different electric wires having different colored markers have to be manufactured.

Advantageous Effects of the Invention

According to the present invention, it is possible to provide the electric wire and the wiring harness that allows for reduction in the ink usage and the manufacturing costs without degrading the discernibility of the manually-incorporated wire.

According to the present invention, it is possible to provide the method for manufacturing the wiring harness that can reduce the ink usage and yet allows for discernibility of the electric wires.

BRIEF DESCRIPTION OF THE DRAWINGS

The present invention may be better understood, and its objects, features, and advantages made apparent to those skilled in the art by referencing the accompanying drawings, in which.

DESCRIPTION OF EXEMPLARY EMBODIMENT

Figure 1A:
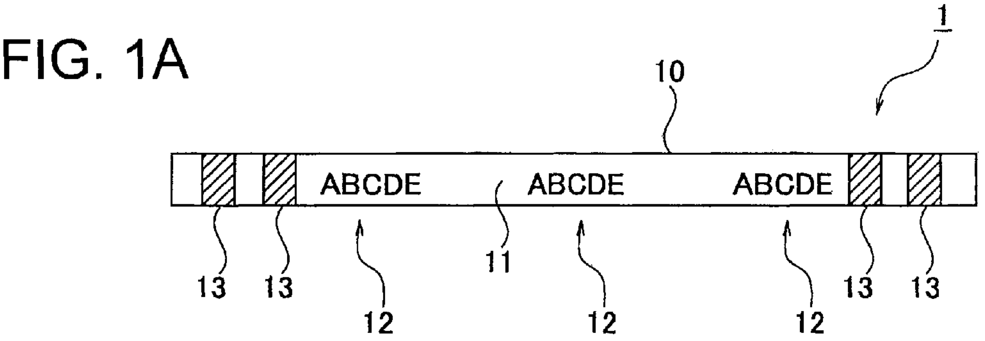
FIG. 1A depicts an electric wire serving as a manually-incorporated wire according to one embodiment of the present invention.
Figure 1B:
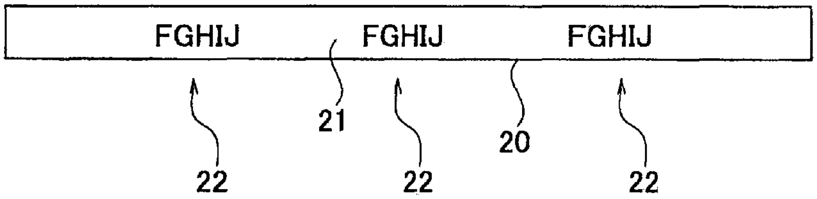
FIG. 1B depicts an electric wire serving as a mechanically-incorporated wire according to one embodiment of the present invention.

In the following description of a preferred embodiment of the present invention, reference is made to the accompanying drawings. FIG. 1 illustrates electric wires according to one embodiment of the present invention. FIG. 1A illustrates a manually-incorporated wire and FIG. 1B illustrates a mechanically-incorporated wire. The illustrated electric wires 1 are made by covering electrically-conductive conductor portions by insulating cover portions 11, 21, respectively.

The electric wire 1 illustrated in FIG. 1A is a manually-incorporated wire 10. The manually-incorporated wire 10 is the electric wire 1 that is manually put together by an operator who works on assembly of the wiring harness. The manually-incorporated wire 10 of this kind is made by covering a core wire by the cover portion 11. In this embodiment, the cover portion 11 uniformly has either (a) a single color consisting of one color such as white or (b) a coating resin's original color.

Also, a circuit identifier 12 is provided by printing upon an intermediate portion of the manually-incorporated wire 10, the circuit identifier 12 being indicative of a connection destination to which the electric wire 1 is to be connected. A plurality of the circuit identifiers 12 are printed at regular intervals upon the electric wire that has a predetermined length. Further, the manually-incorporated wire 10 includes a colored marker 13 provided at an end portion of the electric wire 1, the colored marker 13 indicating that the electric wire 1 is the manually-incorporated wire 10 so that the operator performs his or her manual assembly operation smoothly by referencing the colored marker 13 of the manually-incorporated wire 10.

Meanwhile, the electric wire 1 illustrated in FIG. 1B is a mechanically-incorporated wire 20. The mechanically-incorporated wire 20 is the electric wire 1 that is put together using a machine for assembly of the wiring harness. The mechanically-incorporated wire 20 of this type is configured by covering a core wire by the cover portion 21. In this embodiment, the cover portion 21 uniformly has the single color or the original color of the coating resin.

Also, a circuit identifier 22 is provided by printing upon an intermediate portion of the mechanically-incorporated wire 20, the circuit identifier 22 being indicative of a connection destination of the electric wire 1. A plurality of the circuit identifiers 22 are provided at regular intervals on the electric wire 1 having a predetermined length. In this context, no coloring feature is provided at an end portion of the mechanically-incorporated wire 20, for the mechanically-incorporated wire 20 does not need to be put together manually by the operator but it is put together by a machine with judgment made by the machine on the basis of the circuit identifier.

FIG. 2 is an illustration of a variant of the manually-incorporated wire 10 illustrated in FIG. 1. FIG. 2A illustrates a first variant, FIG. 2B a second variant, FIG. 2C a third variant, FIG. 2D a fourth variant, and FIG. 2E a fifth variant.

Figure 2A:
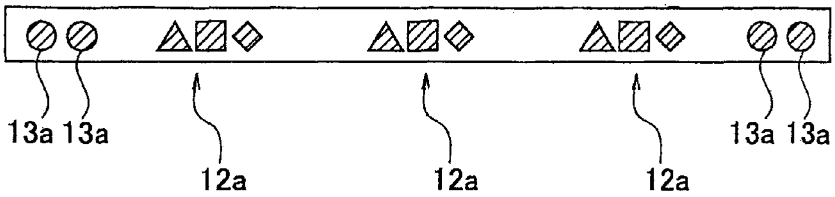
FIG. 2A depicts a first variant of the manually-incorporated wire in FIG. 1A.

Referring to FIG. 2A, the manually-incorporated wire 10 of the first variant includes a circuit identifier 12*a* represented by a symbol. Also, a colored marker 13*a* is provided at its end portion in the form of a round dot.

Figure 2B:
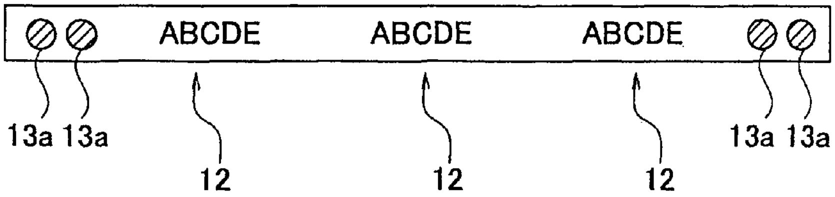
FIG. 2B depicts a second variant of the manually-incorporated wire in FIG. 1A.
Figure 2C:
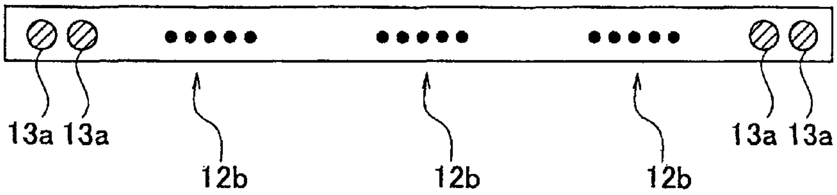
FIG. 2C depicts a third variant of the manually-incorporated wire in FIG. 1A.
Figure 2D:
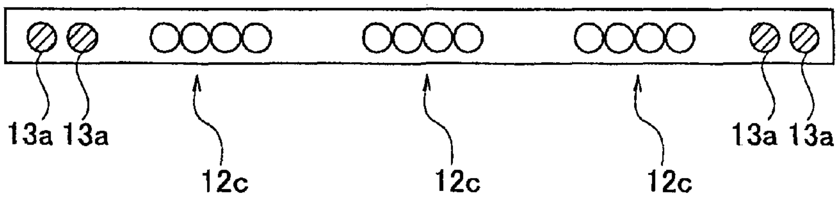
FIG. 2D depicts a fourth variant of the manually-incorporated wire in FIG. 1A.

Also, the manually-incorporated wires 10 of the second and third variants illustrated in FIG. 2B to FIG. 2D include the circuit identifier 12 in the form of character is printed thereupon (see FIG. 2B) and a circuit identifier 12*b* in the form of points in a predetermined number and/or combination printed thereupon (see FIG. 2C), respectively. Further, the manually-incorporated wire 10 of the fourth variant includes a circuit identifier 12*c* in the form of a dot mark provided thereupon (see FIG. 2D). The manually-incorporated wires 10 each include the colored marker 13*a* in the form of round dot at an end portion thereof (see FIGS. 2B to 2D).

Figure 2E:
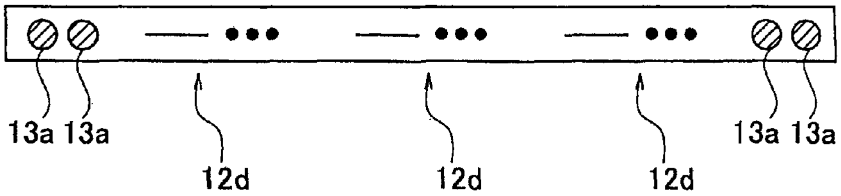
FIG. 2E depicts a fifth variant of the manually-incorporated wire in FIG. 1A.

In addition, the colored marker 13 a in the form of round dot is provided at an end portion of the manually-incorporated wire 10 of the fifth variant illustrated in FIG. 2E. Also, a circuit identifier 12*d* in Morse code is provided on the manually-incorporated wire 10 of the fifth variant.

In this manner, the circuit identifiers 12 to 12*d* may be represented by any one of a character, a symbol, a point, and a dot. In these cases, in contrast to representation of information by the coloring features, it is possible to allow for more compact representation of the information and thereby reduce ink usage. Also, the colored marker 13, 13*a* at the end portion may be represented in any possible manner.

Further, the colored markers 13, 13*a* at the end portion are made using an ink inferior to the ink used in printing or marking of the circuit identifier 12 to 12*d*, inferior in at least one property selected from the group consisting of adhesiveness, weatherability, heat resistance, and chemical resistance. In this context, the manually-incorporated wire 10 only needs to be discerned in the assembling process of the wiring harness, and after (the electric wires have been) put together, there will be no problem if the colored markers 13, 13*a* come off (the electric wires 1). Accordingly, by providing the colored marker using the ink inferior in at least one property selected from among the weatherability, the heat resistance, and the chemical resistance, the colored marker is allowed to be made by inexpensive ink, which allows for reduction in the manufacturing costs.

Figure 3:
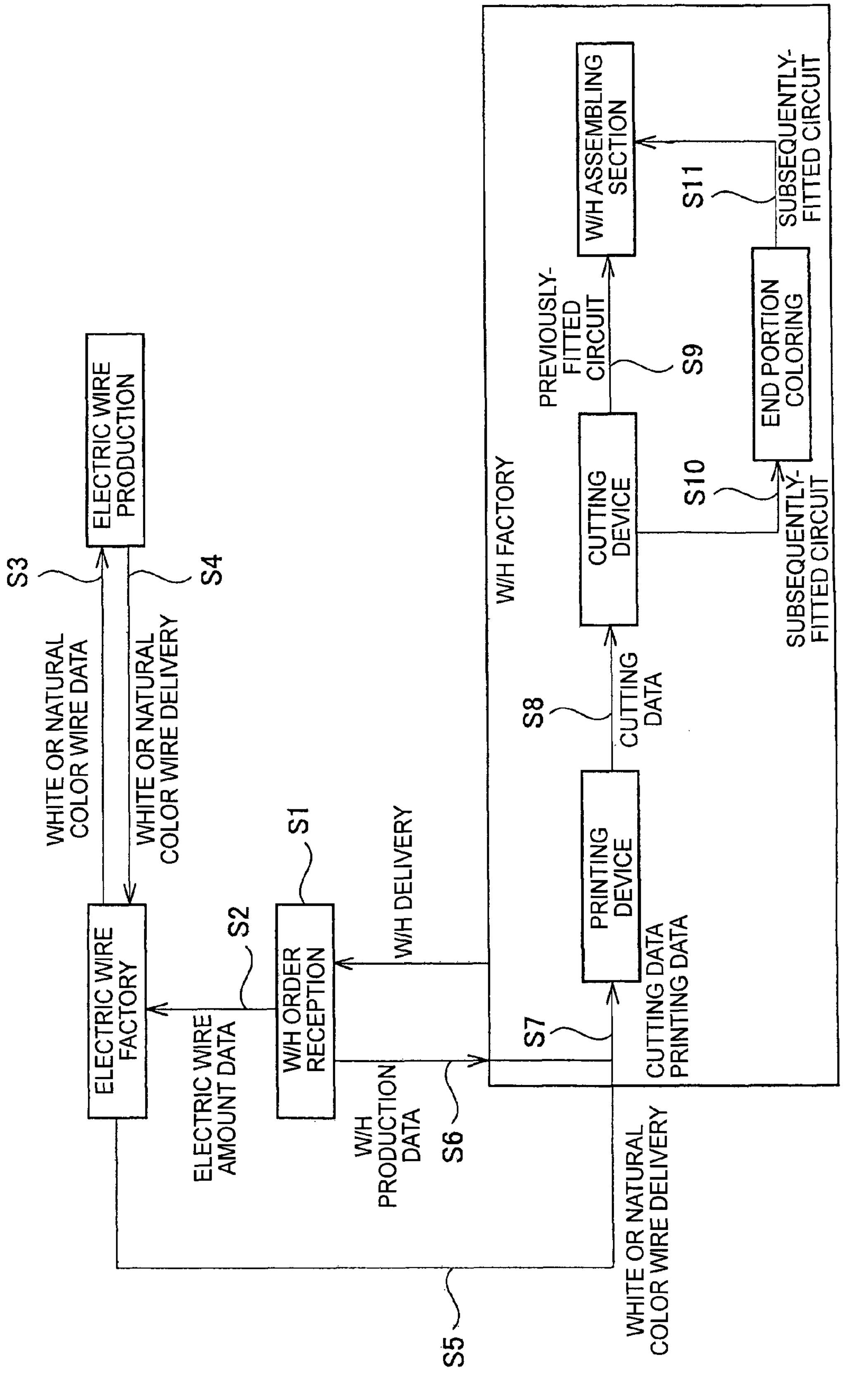
FIG. 3 is a process chart of a method for manufacturing a wiring harness according to this embodiment.

Next, the following describes the method for manufacturing the wiring harness according to this embodiment. FIG. 3 is a process chart of the method for manufacturing the wiring harness according to this embodiment. Referring to FIG. 3, first, when an order for the wiring harness is received (S1), data indicative of necessary amount of electric wires in the course of manufacturing of the wiring harness is sent to an electric wire factory (S2).

In the electric wire factory, electric wire data regarding the single color or the coating resin's original color (hereafter called "natural" color) is created (S3). In accordance with this electric wire data, a single-color or natural-color electric wire 1 is manufactured (this step is referred to as "electric wire manufacturing step"). Subsequently, the manufactured single-color or natural-color electric wire 1 is delivered to the electric wire factory (S4). Further, the single-color or natural-color electric wire 1 is delivered from the electric wire factory to a wiring harness factory (S5).

Also, when the order for the wiring harness is received (S1), wiring harness production data indicative of amount of the wiring harness (or harnesses) to be manufactured is sent to the wiring harness factory (S6).

In the wiring harness factory, cutting data and printing data are created on the basis of the wiring harness production data (S7). In this context, the cutting data is data indicative of the number and length (in units of meters) of the continuously fed electric wire 1 to be cut, and the printing data is data for use in printing of the circuit identifiers 12 to 12*d*.

Further, printing operation is carried out by the printing device. In this context, the circuit identifier 12 to 12*d* indicative of the connection destination of the electric wire 1 is printed or provided in the form of a mark upon the continuously fed electric wire 1 (a printing step). Also, in this process, the plurality of the circuit identifiers 12 to 12*d* are provided at regular intervals upon the intermediate portion of the electric wires 1 that have already been cut.

Next, the cutting data is transmitted from the printing device to the cutting device (S8). In accordance with the cutting data, the electric wire 1 that underwent the printing operation is cut in the predetermined length (cutting step). After that, among the electric wires 1 that have been cut, the electric wire 1 serving as the mechanically-incorporated wire 20 is delivered to a wiring harness assembling section (S9).

Meanwhile, with regard to the electric wire 1 serving as the manually-incorporated wire 10 among the electric wires 1 that have been cut, its end portion is colored (S10; an end portion coloring step). At this point, the colored markers 13, 13*a* are made by the ink inferior in at least one property selected from among the adhesiveness, the weatherability, the heat resistance, and the chemical resistance, being inferior to the ink used in the above printing operation. After the coloring operation, the manually-incorporated wire 10 is delivered to a wiring harness assembling section.

In the wiring harness assembling section, the various electric wires 1 that have been cut (including both the manually-incorporated wire 10 and the mechanically-incorporated wire 20) are combined to constitute the wiring harness (wiring harness assembling step). Specifically, the mechanically-incorporated wire 20 is put together by the machine and the manually-incorporated wire 10 is put together by the operator confirming the colored marker 13, 13*a*.

In this manner, since the colored marker 13, 13*a* of this embodiment indicating that this electric wire 1 is the manually-incorporated wire 10 is provided at the end portion of the cover portion 11, the mechanically-incorporated wire 20 does not need to have a coloring feature, i.e., the colored marker in the context of this embodiment, which allows for reduction in the ink usage.

The operator manually incorporating the electric wire into the wiring harness can discern the electric wire 1 (from the other electric wires) by referencing the colored marker. Thus, the method of the present invention not only allows for the reduction in the ink usage but also achieves a sufficient level of discernibility of the electric wires.

Also, the circuit identifiers 12 to 12*d* indicative of the connection destination are provided by printing, or provided in the form of a mark, upon the intermediate portion of the cover portion 11. Accordingly, in contrast to the case where only the colored markers are relied on to discern the electric wires 1, the electric wires 1 can be discerned by characters, dots, and symbols, and thus the representation of information can become more compact, which leads to reduction in the ink usage.

Further, the colored marker at the end portion is made by the ink inferior in at least one property selected from among the adhesiveness, the weatherability, the heat resistance, and the chemical resistance, being inferior to that used in the circuit identifiers 12 to 12*d* at the intermediate portion. Accordingly, the manually-incorporated wire only needs to be discerned in the wiring harness assembling process, and one the assembling process is completed, there will be no problem even when the colored markers 13, 13*a* come off (the electric wires). Thus, by providing the colored marker using the ink inferior in any one of the weatherability, the heat resistance, and the chemical resistance, the colored marker can be made using an inexpensive ink, so that the manufacturing costs are reduced. In summary, it is possible to reduce ink usage and manufacturing costs without degrading the disernibility of the electric wires 1.

Also, the circuit identifiers 12 to 12*d* are provided at regular intervals on the intermediate portion. Accordingly, even when the electric wire 1 is partly burnt out due to reasons related to automobile's environment at and after the stage of incorporation of the electric wires into the wiring harness, it will be possible to read the circuit identifiers 12 to 12*d* relying upon the remaining portion.

Further, since the cover portion 11 has the single color or the coating resin's original color, it is possible to reduce the manufacturing costs. In addition, since the electric wire 1 has the single color or the coating resin's original or natural color, it is possible to facilitate reduction in inventory quantity when compared with a case where various electric wires 1 having different colored markers are manufactured.

Also, the wiring harness includes (a) the electric wires 1 and (b) the other electric wire, which does not have the colored marker indicating that the electric wire is the manually-incorporated wire 10 but has the circuit identifier 22 indicative of the connection destination at the intermediate portion of the cover portion 21 thereof. Accordingly, it is possible to provide the wiring harness that allows for reduction in the ink usage and the manufacturing costs.

The present invention has been described in the foregoing based on its exemplary embodiment, but the present invention is in no way limited to the above-described embodiment. Modifications may be made to the present invention within the scope of the present invention.

For example, the circuit identifiers 12, 12*a* and the colored markers 13, 13*a* are not limited to the illustrated ones, but may take other shapes and patterns.

Further, the cover portions 11 in the above-described embodiment uniformly have the single color or the original (or natural) color of coating resin. In this context, when the cover portions 11 uniformly have the coating resin's original color, it is preferable that the cover resin to be used be determined in accordance with the types of conductors (for example, copper, which may include annealed copper, pure copper, hard-drawn copper, and aluminum) such that the types of conductors can be identified by referencing the color of the cover portion 11 for, by doing so, the conductor can be discerned or identified by its external appearance.

REFERENCE SIGNS

1 Electric wire
10 Manually-incorporated wire
11 Cover portion
12 Circuit identifier
12*a* Circuit identifier
12*b* Circuit identifier
12*c* Circuit identifier
12*d* Circuit identifier
13 Colored marker
13*a* Colored marker
20 Mechanically-incorporated wire
21 Cover portion
22 Circuit identifier

The invention claimed is:

1. A wiring harness comprising:

(a) at least one electric wire to be incorporated into the wiring harness manually by an operator, the at least one electric wire including an electrically-conductive conductor portion, an insulating cover portion covering the conductor portion, a colored marker provided on an end portion of the cover portion, the colored marker indicating that the at least one electric wire is a manually-incorporated wire, and a circuit identifier provided on an intermediate portion of the cover portion, the circuit identifier being made by printing or provided in a form of a mark and indicative of a connection destination of the electric wire, wherein the colored marker in the end portion is made by an ink inferior to that of the circuit identifier on the intermediate portion in at least one property selected from the group consisting of adhesiveness, weathering resistance, heat resistance, and chemical resistance; and (b) at least another electric wire to be incorporated into the wiring harness mechanically, the at least another electric wire having a cover portion which end portion does not include the colored marker and which intermediate portion includes the circuit identifier indicative of a connection destination of the at least another electric wire.

2. The wiring harness according to claim 1, wherein a plurality of the circuit identifiers are provided at regular intervals on the intermediate portion of the cover portions of the at least one electric wire and the at least another electric wire.

3. The wiring harness according to claim 2, wherein the cover portions of the at least one electric wire and the at least another electric wire each have a single color or an original color of coating resin.

4. A method for manufacturing a wiring harness, comprising the steps in the sequence set forth:

(a) printing, or providing in a form of a mark, a circuit identifier upon a continuously fed electric wire, the circuit identifier being indicative of a connection destination of the electric wire;

(b) cutting in a predetermined length the electric wire having the circuit identifier;

(c) providing a colored marker on an end portion of at least one electric wire selected from the electric wires that have been cut, the at least one electric wire being adapted to be incorporated into the wiring harness manually by an operator; and (d) putting together the at least one electric wire serving as the manually-incorporated wire and at least another electric wire selected from the electric wires that have been cut to construct the wiring harness, the at least another electric wire being adapted to be incorporated into the wiring harness mechanically, and having a cover portion which end portion does not include the colored marker and which intermediate portion includes the circuit identifier indicative of a connection destination.

5. The method as claimed in claim 4 wherein, in the step (a), a plurality of the circuit identifiers are provided at regular intervals on the electric wires that have been cut.

6. The method as claimed in claim 5 further comprising the step of manufacturing the electric wire prior to the step (a), wherein a cover portion of the manufactured electric wire has a single color or an original color of coating resin.

7. A wiring harness comprising at least one electric wire, the wire including:

a colored marker provided on an end portion of a cover portion, indicating that the wire is a manually-incorporated wire; and a circuit identifier printed or marked on an intermediate portion of the cover portion, indicating a connection destination of the wire, wherein an ink of the colored marker has lower adhesiveness, weathering resistance, heat resistance, or chemical resistance than that of the circuit identifier.

8. A wiring harness comprising one electric wire and another electric wire, the one electric wire including:

a colored marker provided on an end portion of a cover portion, indicating that the one electric wire is a manually-incorporated wire; and a circuit identifier printed or marked on an intermediate portion of the cover portion, indicating a connection destination of the one electric wire, the another electric wire including:

a circuit identifier printed or marked on an intermediate portion of a cover portion, indicating a connection destination of the another electric wire; and no colored marker, which indicates that the another electric wire is a mechanically-incorporated wire, wherein an ink of the colored marker has lower adhesiveness, weathering resistance, heat resistance, or chemical resistance than that of the circuit identifier.

9. A method for manufacturing a wiring harness, comprising steps in sequence set forth:

(a) selecting one electric wire to be incorporated into the wiring harness manually by an operator and another electric wire to be incorporated into the wiring harness mechanically;

(b) providing a colored marker only on an end portion of the one electric wire; and (c) incorporating the one electric wire and the another electric wire into the wiring harness.

10. A method for manufacturing a wiring harness, comprising steps in sequence set forth:

(a) printing or marking a circuit identifier on a continuously fed electric wire, the circuit identifier being indicative of a connection destination of the electric wire;

(b) cutting the electric wire in a predetermined length;

(c) selecting one electric wire to be incorporated into the wiring harness manually by an operator and another electric wire to be incorporated into the wiring harness mechanically;

(d) providing a colored marker only on an end portion of the one electric wire, which ink has lower adhesiveness, weathering resistance, heat resistance, or chemical resistance than that of the circuit identifier; and (e) incorporating the one electric wire and the another electric wire into the wiring harness.

* * * * *